United States Patent
Gillery et al.

[15] 3,655,545

[45] Apr. 11, 1972

[54] POST HEATING OF SPUTTERED METAL OXIDE FILMS

[72] Inventors: Frank H. Gillery, Allison Park; Jean P. Pressau, Evans City, both of Pa.

[73] Assignee: PPG Industries, Inc., Pittsburgh, Pa.

[22] Filed: July 2, 1970

[21] Appl. No.: 56,117

Related U.S. Application Data

[63] Continuation of Ser. No. 709,135, Feb. 28, 1968, abandoned.

[52] U.S. Cl............................................................204/192
[51] Int. Cl...............................................................C23c 15/00
[58] Field of Search..................................................204/192

[56] References Cited

UNITED STATES PATENTS

| | | | |
|---|---|---|---|
| 3,506,556 | 4/1970 | Gillery et al. | 204/192 |
| 3,438,885 | 4/1969 | Lewis et al. | 204/192 |
| 3,386,906 | 6/1969 | Bronnes | 204/192 |
| 3,370,978 | 2/1968 | Pollack et al. | 117/217 |
| 3,336,661 | 8/1967 | Polinsky | 317/235 |
| 3,108,019 | 10/1963 | Davis | 117/62 |
| 2,825,687 | 3/1958 | Preston et al. | 204/192 |
| 2,597,562 | 5/1952 | Blodgett | 117/62 |
| 3,420,706 | 1/1969 | Kuo | 117/62 |

FOREIGN PATENTS OR APPLICATIONS

| | | | |
|---|---|---|---|
| 566,773 | 12/1958 | Canada | 204/192 |

*Primary Examiner*—John H. Mack
*Assistant Examiner*—Sidney S. Kanter
*Attorney*—Chisholm & Spencer

[57] ABSTRACT

This invention relates to a novel method of producing electroconductive metal oxide films by cathodic sputtering. It especially pertains to a method of increasing the electroconductivity of sputtered metal oxide films by mildly reducing said films. The reduction step follows sputtering and generally involves heating the metal oxide film in a non-oxidizing or reducing atmosphere for a sufficient period of time to reduce the oxygen content of said film by a minor amount but without substantially reducing the oxide film to metallic form.

10 Claims, 1 Drawing Figure

PATENTED APR 11 1972
3,655,545
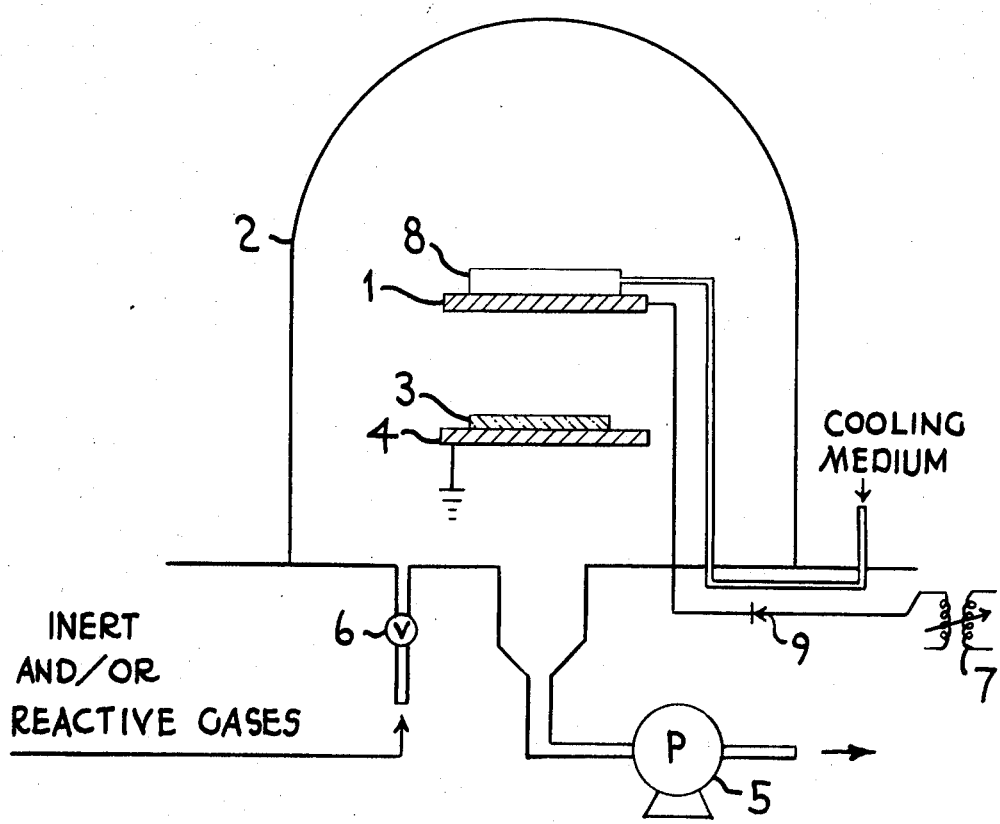
INVENTORS
F.H. GILLERY and
J.P. PRESSAU
BY
Christolen and Spencer
ATTORNEYS

POST HEATING OF SPUTTERED METAL OXIDE FILMS

This application is a continuation of application Ser. No. 709135, filed Feb. 28, 1968, now abandoned.

BACKGROUND OF TECHNOLOGY

The deposition of metals and metal oxide films by cathodic sputtering is a well-known process. U.S. Pat. No. 3,242,006 discloses a process for the preparation of tantalum nitride by cathodic sputtering. In cathodic sputtering processes, the applied voltage energizes gaseous ions in a vacuum chamber and causes such ions to strike a cathode, thereby displacing a metal particle. The metal particle migrates to the substrate to be coated, said substrate frequently being an anode.

In cathodic sputtering processes, a vacuum of greatly reduced pressure is necessary to provide the proper conditions for a glow discharge to occur between the cathode and the anode. A glow discharge energizes gaseous ions present between the cathode and the anode.

An alternate technique for depositing metal oxide films on a substrate comprises contacting a heated substrate with a metal salt or organometallic compound which pyrolyzes at the temperature of the substrate to form thereon an adherent metal oxide film. One disadvantage of pyrolyzation processes resides in the elevated temperatures necessary for depositing a suitable metal oxide film. When glass is utilized as the substrate, for example, the necessary pyrolyzation temperatures approach the softening point of the glass, thereby causing undesirable optical distortion in the glass. Cathodic sputtering processes, however, do not require the substrate to be heated to elevated temperatures. Such processes are especially amenable, therefore, for producing transparent metal oxide films on high quality optical glass substrates.

Metal oxide films, regardless of the method of application, have one disadvantage: low conductivity. Transparent tin oxide films, for example, frequently have resistances of over 2,000 ohms/square for a 6,000 A° thick film (specific resisitivity of about 0.12 ohms - cm.), while pure metallic films such as tin or copper may have resistances of less than 1 ohm/square for similar film thicknesses. Thin metal oxide films, however, have much better adhesion, durability, and light transmission than the pure metal films. One objective of research in this area has been the development of an adherent metal oxide film which has a conductivity approaching that of the metal films.

One successful approach towards improving the conductivity of a metal oxide film has involved "doping" with another metal, generally one of a higher valence. The "doping" metal apparently takes a position in the lattice of the metal oxide film and provides a greater electron density.

The doping of vacuum-deposited tin oxide films with antimony has produced transparent tin oxide films having resistances less than 1,000 ohms/square. Such developments have been reported by Holland in his text, "Vacuum Deposition of Thin Films," Chapman and Hall, Ltd., London (1963) at page 497. Indium oxide films, for example, doped with tin have been produced by sputtering to have resistances of as low as about 35 ohms/square at a thickness of about 6,000 A°.

Another technique of producing conductive oxide films of tin or indium is disclosed in U.S. Pat. No. 2,769,778 issued to Preston. Preston sputtered tin or indium in a deficiency of oxygen to form a substantially metallic film which was later converted to an oxide film by heating under oxidizing conditions. Film resistances of 500 to 1,000 ohms/square were achieved at 500 microns film thicknesses.

INVENTION

It has now been discovered that the conductivity of pure metal oxide and doped metal oxide films produced in the presence of oxygen by cathodic sputtering or other means can be increased by subjecting such films to reduction. The reduction is conducted after a film of desired thickness is deposited. The effect is novel inasmuch as the metal to oxygen ratio of the film is altered only very slightly; in fact, the change is practically undetectable. A substantial decrease in the oxygen content of a transparent film is readily detected inasmuch as the light transmission of the film substantially decreases.

The reduction process of this invention is conveniently obtained by heating, at a minimum temperature of about 200° C. and, preferably, a temperature of about 240° to 340° C. The duration of heat treatment depends on the time taken for the films to come into equilibrium with the surrounding atmosphere, in practical cases, about two hours or less.

The gas in contact with the film during heating is an important part of the process. The heat treatment may be conducted under vacuum, at atmospheric pressure or at elevated pressures. It has been found that heating in oxygen-containing atmospheres increases the conductivity of metal oxide films. At temperatures of less than about 300° C., the oxygen content of air may be insufficient to oxidize further metal oxide films produced by sputtering in an oxygen containing atmosphere. However, it has been found that a significant increase in conductivity is obtained if the atmosphere is inert, that is, contains no oxygen, or, more significantly, if hydrogen or some other reducing agent is present.

Over reduction of the oxide films should be avoided since this results in a dark film having reduced light transmission. Over reduction may be caused by heating at extremely high temperatures or heating for an extended duration. Control of the operation may readily be established for a particular type of film by initially heating stepwise, checking conductance after each heat treatment, and continuing heating until a desired or optimum conductance and light transmission is achieved. Generally, observance of the temperature limits set forth herein will preclude overheating, especially if the duration of heating is shortened as the temperature is increased.

Besides the gain in conductivity of the film due to reduction, some of the increased conductivity is also due to annealing and densification of the film by the heat. This is commonly experienced in many metal films and may partially explain the increase in conductivity obtained by heating metal oxide films in the presence of an oxygen containing atmosphere. The two effects can be distinguished, because the reduction effect is partly reversible, that is, this part of the conductivity gain can be lost by reheating in a more oxidizing atmosphere, whereas the densification effect is irreversible. In theory, the reduced state of the film could be obtained by sputtering in an atmosphere containing only argon with less than the usual concentration of oxygen. In practice it is very difficult to control all the conditions required in the vacuum system to obtain this result. If the oxygen concentration is too low, dark films are obtained, indicating the presence of a lower oxide of the metal or sometimes the metal itself.

The invention is also applicable to metal oxide films doped with a metal having a higher valence state. For example, indium oxide films are doped with tin oxide while tin oxide films are doped with antimony oxide. The doped metal oxide films have considerably lower resistances than the pure metal oxide films. The present invention is especially useful inasmuch as it presents a technique for making further improvements in the conductivity of doped metal oxide films.

This invention is also particularly applicable to transparent metal oxide films. Additional conductance may be obtained in opaque metal oxide films by increasing the thickness of the film. However, when a highly transparent metal oxide film is desired, the specific conductivity of the film itself must be increased in order to achieve any increase in film conductance without sacrifice of transmission. Transparent metal oxide films, that is, those having a thickness of less than about 6,000 angstroms have been produced according to the teaching of this invention with resistances as low as about 15 ohms/square or less. When hydrogen is present during the post-heating step, the ultimate resistance for a doped metal oxide film is about 10 ohms/square or less. For example, indium oxide films doped with tin oxide have been produced according to the teaching of this invention with a film resistance of about 10 ohms/square for a film thickness of about 6,000 angstroms.

For a better understanding of the invention, reference is now made to the figure which depicts a typical sputtering apparatus.

The sputtering apparatus is composed of a vacuum chamber 2 which contains a cathode 1 which is preferably constructed of the metal whose oxide is to be deposited on the substrate 3. The substrate 3 is supported by a substrate support 4 which may be heated or cooled to improve the properties of the metal oxide. The substrate support 4 can be grounded to form an anode. The cathode 1 is connected to a high-voltage supply 7 and rectifier 9 which create a high-potential differential between the cathode 1 and the substrate support 4 (anode). The high-potential differential provides the glow-discharge necessary to cause deposition of the metallic oxide from the cathode onto the substrate. The vacuum is obtained by a vacuum pump 5 which exhausts the vacuum chamber to a pressure of about 20 millitorr or lower. Higher pressures may be utilized, for example, up to 40 millitorr and above; however, the applied voltage may require adjusting to achieve a suitable glow-discharge.

For the purposes of this invention, the vacuum chamber is equipped with an inlet port 6 for introducing inert and/or reactive gases into the vacuum chamber. After the proper vacuum is obtained, preferably a pressure of less than about $10^{-5}$ torr, the required atmosphere for sputtering is obtained by introduction of a small amount of the desired gas which frequently comprises at least a small quantity of an inert gas.

A typical procedure for depositing a metallic oxide film utilizing the above-described apparatus involves the application of about 2,500 volts to the cathode after the system has been evacuated to a pressure of about 20 millitorr. The voltage applied to the system is that necessary to obtain a suitable glow-discharge and, therefore, will vary with pressure, cathode to substrate distance, gas composition, and the like. A cathode of the dimensions of 12.5 centimeters by 12.5 centimeters is positioned 25 millimeters above a glass sample which is a 10 centimeter square. The indium cathode is cooled by cooling means 8 which is a miniature heat exchanger cooled by introduction of a cooling medium such as a cool gas or a cool liquid.

The atmosphere in the vacuum chamber may typically contain about 40 to 15 per cent oxygen and about 60 to 85 per cent argon, although wide variations of atmosphere composition are useful. The pressure of the vacuum chamber after introduction of the appropriate gases should be in the range of about 20 millitorr. The substrate temperature should be maintained in the range of about 300° C., although temperatures as low as room temperature may be used. Operation under these conditions results in formation of a transparent conductive film having a resistance of about 280 to 700 ohms/square after about 60 minutes of operation. A wide range of operating conditions is feasible, attended by a wide variation in the properties of deposited films.

The invention described herein is especially useful in that it is especially adaptable for producing transparent metal oxide coatings of varying conductivities. Films of various conductivities may be achieved by varying the duration of the post-heating cycle. Although it is known that lowering the oxygen concentration in the sputtering atmosphere increases conductivity, an increase accomplished by a reduction of the amount of oxygen present may detrimentally affect the light transmission of the films. The resulting film would have properties approaching that of a pure metallic film which has considerably less light transmission and less adhesion to substrates, especially glass, than a metal oxide film.

Various types of metal oxide films may be deposited by the technique of this invention. Especially good films of oxides of a metal having an atomic number between 48 and 51, for example, tin oxide, indium oxide, and cadmium oxide, may be deposited by sputtering in an oxygen-containing atmosphere and subsequently heating to a temperature above about 240° C. in a non-oxidizing atmosphere. The conductivity of the resulting metal oxide films is about an order of magnitude greater than that of the metal oxide films not subjected to a post-heat treatment. For example, as indicated above, transparent sputtered indium oxide films doped with tin generally have a mean resistance of about 50 ohms/square. However, tin "doped" indium oxide films of similar thicknesses have been produced by the teaching of this invention with resistances of about 20 ohms/square; a significant increase in conductivity (conductivity being the inverse of resistivity) of the film. Through optimization of the operating conditions, films of useful transmission having resistances as low as 15 ohms/square or lower are producible in reasonable industrial times.

In using the term "metal oxide" it is intended to refer to the higher valent and lower valent oxides of a metal which may exist in more than one valence state. Generally, it is the higher valent metal oxide which is present in the deposited film. However, substantial quantities of the lower valent oxide may be present. For example, tin oxide films are believed to consist primarily of stannic oxide, although minor quantities of stannous oxide may be present, especially when a deficiency of oxygen exists in the sputtering atmosphere.

The operating conditions for the sputtering process of this invention are similar to those of prior art sputtering processes. A minimum voltage of about 50 volts is required to achieve a glow discharge while a minimum voltage of about 100 volts is required to achieve a build up of metal oxide deposits within a reasonable time. A preferred operating voltage is above about 1,000 volts and, for commercial operations, a voltage of over 1,500 volts is recommended.

The distance maintained between metal cathode and substrate varies with the cathode area, power utilized, gas pressure, and the like. Usual distances are 21 to 35 mm, although greater and lesser distances may be utilized.

The operating pressure is generally about 20 millitorr although pressures as low as 5 millitorr are useful. Also, pressures of the order of 100 millitorr or higher may be successfully utilized. The process is operable at lower pressures in the presence of a magnetic field. The utilization of higher pressures involves increased collisions between the migrating particles and the gas atoms of the atmosphere, thereby diminishing the rate of deposition.

The content of the sputtering atmosphere may be varied considerably. An inert gas, such as argon, nitrogen, or the like, may or may not be present. If an inert gas is utilized, it may be present in concentrations of less than 1 per cent by weight to about 94 per cent by weight of the total weight of gases present. It is generally preferred to have an inert gas present, preferably in concentrations of about 5 per cent to about 87 per cent by weight of the gases present. The heavier inert gas ions enhance the sputtering rate. The oxygen concentration may vary from about 90 per cent or more to about 5 per cent or less. As noted above, films deposited in an atmosphere of high oxygen concentration tend to have high resistivity (low conductivity) while films deposited in an atmosphere having a low oxygen concentration tend to have greater conductivity but less light transmission. For most purposes, a preferred oxygen concentration for sputtering of metal oxide films is between about 10 per cent and 60 per cent by weight of the total gases present.

As previously indicated, the cathode comprises a metal having an atomic number between 48 and 51, that is, cadmium, indium, tin, and antimony. These metals should be substantially pure when used for sputtering, although particular impurities may enhance the sputtering rate. For example, a metal of higher atomic weight in minor quantities, that is, up to about 20 per cent by weight, and preferably of less than 15 per cent by weight of the total cathode weight, enhances the sputtering rate. Tin has a faster sputtering rate than indium and, therefore, increases the overall sputtering rate. Antimony acts as a dopant for tin.

The substrate temperature may be controlled by cooling, if desired. By cooling the substrate, additional power may be applied and the sputtering rate thereby increased.

The following examples illustrate specific embodiments of the aboveidescribed invention.

EXAMPLE I

Transparent indium oxide films were prepared by sputtering in an oxygen-argon atmosphere at a voltage of 2,500 volts and current of 750 MA for a period of 60 minutes. The cathode to substrate distance was 27 millimeters. The sputtering atmosphere composition and pressure was varied as well as the anode (substrate) temperature.

The indium cathode contained various quantities of tin as a dopant. Following sputtering, each film was post heated in hydrogen for a period of two hours at 245° C. The following table presents the results of this experiment.

TABLE I

| Sample | Percent Sn in Sn-In alloy | Percent O₂ in O₂—A mixture | Operating pressure torr | Anode temp. °C. | Film color by reflectance | Resistance, ohms/sq. | After heating resistance |
|---|---|---|---|---|---|---|---|
| A | 3.18 | 75 | 0.045 | 340 | 6th green | 60 | 24 |
| B | 5.64 | 95 | 0.046 | 397 | 6th green | 35 | 19 |
| C | 11.3 | 35 | 0.050 | 318 | 5th green | 50 | 30 |
| D | 11.3 | 75 | 0.050 | 300 | 5th red | 82 | 48 |
| E | 11.3 | 75 | 0.075 | 396 | 7th green | 40 | 22 |

EXAMPLE II

Another group of glass plates were coated to a thickness of approximately 5,000 A° from a cathode of 100 per cent indium by sputtering for one hour at a voltage of 2,100 volts and current of 750 MA. The sputtering atmosphere was 25 per cent by volume oxygen and 75 per cent by volume argon. The resistance of each film was about 370 ohms/square.

Three of these samples were subjected to post heating at a temperature of 300° C. for 60 minutes. Each of the samples was post heated in a different atmosphere. The results were as follows:

| Post Heating Atmosphere | Resistance (ohms/square) After Heating. |
|---|---|
| H₂ (5%) + N₂ (95%) | 24 |
| Natural Gas | 24 |
| Hydrogen | 13 |

The resistance in each instance was substantially reduced from the original resistance of 570 ohms/square, exemplifying the advantageous nature of limited reduction after sputtering. The luminous transmission of each sample was substantially unchanged by this post heating.

EXAMPLE III

An indium oxide film was sputtered onto a 4 × 4 × 1/8 inch glass substrate from an indium cathode containing 1.4 per cent by weight tin under the following conditions:

| | |
|---|---|
| Power | 2,350 volts at 750 MA |
| Cathode to substrate distance | 27 millimeters |
| Atmosphere | 75 per cent O₂ and 25 per cent A |
| Pressure | 43 millitorr |
| Sputtering time | One hour |

The resulting film had a resistance of as low as 95 ohms/square at a thickness of 4th red to 5th green.

The plate was cut into four strips 1 × 4 inch, labeled A, B, C, and D. Samples A, B, and C were heated in hydrogen for one hour. The following results were obtained:

Sample B was overheated and the film was reduced to metallic indium.

Sample C was heated to 310° C.; film slightly darkened and resistance changed to about 15 ohms/square.

Sample A was heated to 310° C.; film resistance was reduced from an average of about 115 ohms/square to about 11 ohms/square without any detectable change in luminous transmission.

Sample D was untreated and retained as a control.

The post heating in hydrogen was conducted by disposing a sample to be treated in a horizontal Vycor tube. The Vycor tube was part of a tube furnace wherein the open ends of the tube extended from either side of the furnace. Hydrogen was introduced at one end of the Vycor tube and burned at the other end. A thermometer placed in the Vycor tube measured the sample temperature.

The term ohms per square has been used hereinabove to describe the conductivity of the films formed by the novel process of this invention. Although specific resistivity is usually utilized to describe or compare the conductivity of materials, it is inappropriate for describing the conductivity of very thin films because of the difficulty of measuring the thickness of the film.

Specific resistance is the resistance between opposite faces of a cubic centimeter of material and is expressed by the equation $$\rho = \frac{R \times A}{L}$$

where $\rho$ is the specific resistance, $R$ is the resistance of the conductor, $A$ is the cross-sectional area of the conductor, and $L$ is the length of the conductor. For a thin film, this expression becomes $$\rho = \frac{R \times W \times t}{L}$$

wherein $W$ and $L$ are the surface dimensions and $t$ is the film thickness. For a square area of surface, $W$ and $L$ are equal and $\rho = R \times t$ or $R$ (resistance for a square area of surface) $= \rho/t$. Thus, the conductivities of various types of films having approximately equivalent thickness may be directly compared by comparing resistance per square.

The thickness of a thin film may be determined by the interference color shown in reflected light, provided the index of refraction is known. For stannic oxide films, a second-order red color indicates a thickness of about 230 millimicrons while a second-order blue color indicates a thickness of about 100 millimicrons. As the thickness of the film increases, its apparent color changes and the order or succession of the colors with increasing thickness is analogous to that of the well-known Newton rings described in The Theory of Optics by Paul Drude, Dover Publications, Inc., New York, at page 136 et seq.

Although the instant invention has been described with reference to films produced by cathodic sputtering, it should be recognized that it is applicable to films produced by other vacuum deposition techniques, e.g., by thermal evaporation.

Although specific examples of the instant invention have been set forth hereinabove, it is not intended that the invention be limited solely thereto, but should include all the variations and modifications falling within the scope of the appended claims.

What is claimed is:

1. A method of producing a transparent, electroconductive metal oxide film exhibiting a low electrical resistance on a substrate comprising cathode sputtering said film on said substrate from a metal cathode source containing one or more metals having an atomic number between 48 and 51 in an oxygen-containing atmosphere consisting essentially of about 5 to about 90 per cent by weight of oxygen in an oxygen-inert gas mixture at a maximum temperature of about 400° C. until a transparent metal oxide film of the desired thickness is obtained, then post heating said film to a temperature between about 200° C. and about 340° C. in a non-oxidizing atmosphere for a period of time sufficient to lower the electrical resistance of said metal oxide film and discontinuing said post heating before the transparency of said film is substantially impaired.

2. The method of claim 1 wherein the post heating is conducted in vacuo.

3. The method of claim 1 wherein the post heating is conducted in a reducing atmosphere.

4. The method of claim 1 wherein the post heating is conducted in a hydrogen-containing atmosphere.

5. The method of claim 1 wherein the substrate is glass.

6. The method of claim 1 wherein post heating is conducted at a temperature of about 240° C. to about 340° C.

7. The method of claim 1 wherein the metal cathode contains indium.

8. The method of claim 7 wherein the post heating is at a temperature of about 240° C. to about 340° C. for less than about two hours.

9. The method of claim 1 wherein the metal cathode contains a greater quantity of indium that that of tin.

10. The method of claim 9 wherein the metal cathode contains a maximum of 20 percent by weight of tin and the balance indium.

* * * * *